United States Patent Office

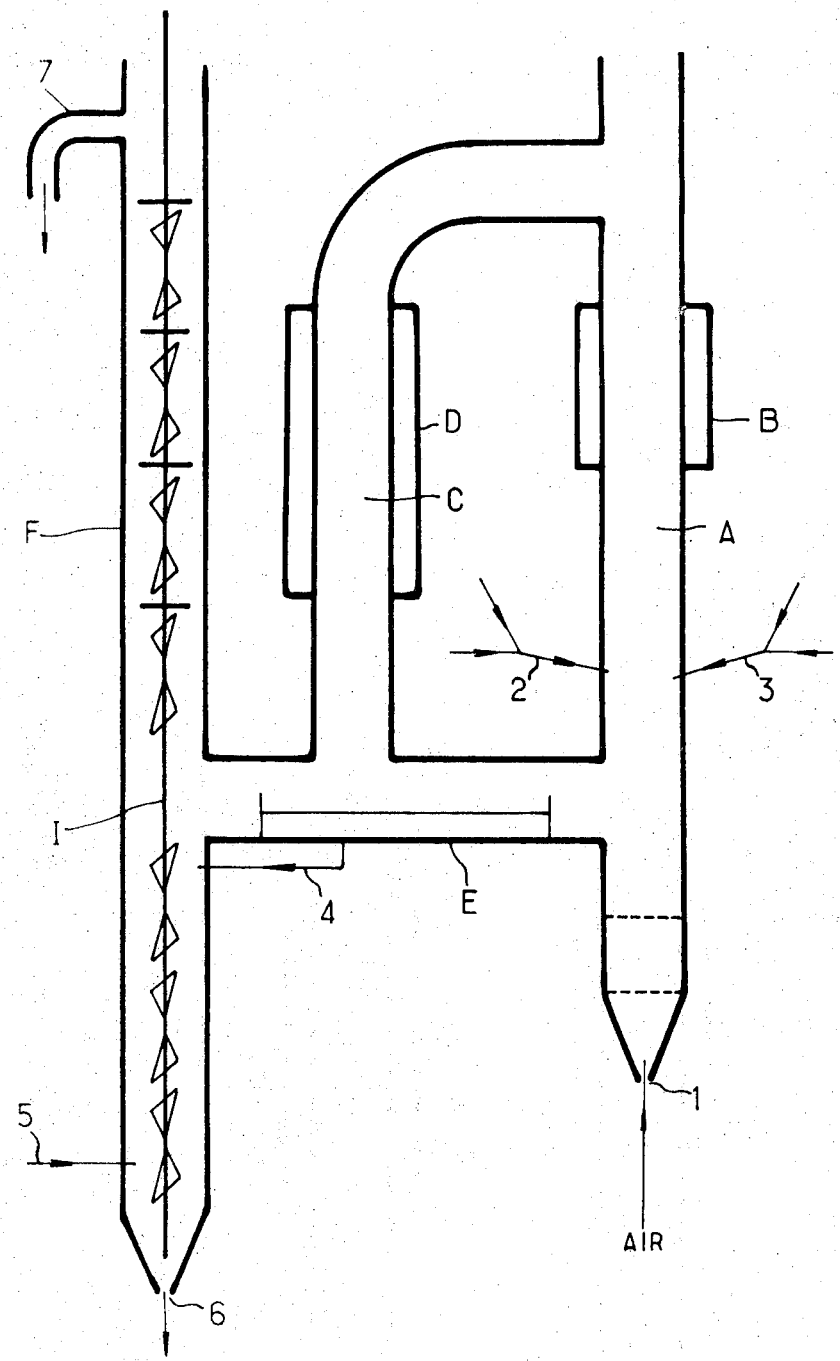

3,849,468
Patented Nov. 19, 1974

3,849,468
METHOD FOR THE CONTINUOUS PREPARATION OF ALKYLPEROXYDICARBONATES
Robert Busseret, Chaponost, France, assignor to Rhone-Progil, Paris, France
Filed Nov. 10, 1972, Ser. No. 305,351
Claims priority, application France, Nov. 18, 1971, 7141287
Int. Cl. C07c 73/00, 73/02
U.S. Cl. 260—463                                   9 Claims

ABSTRACT OF THE DISCLOSURE

A method for the continuous preparation of solutions of organic peroxide such as alkyl peroxydicarbonates, diacylperoxide which may be halogenated, and tertio-butyl peresters comprising continuous displacement in a closed circuit of an aqueous reaction support into which continuous introduction is made of sodium hydroxide, hydrogen peroxide or tertio-butyl hydroperoxide, the acid chloride corresponding to the organic peroxide and a solvent for said peroxide, in which the resulting organic peroxide solution is continuously separated from the support, washed, and then separated from the washing water.

---

This invention relates to a method for the continuous preparation of solutions of organic peroxides.

It has been proposed that solutions of organic peroxydicarbonates can be prepared continuously from the corresponding haloformiate and sodium peroxide at a temperature of from $-10°$ to $+30°$ C., using a method which comprises reacting the reactants in a first reaction zone at a pH of from 8 to 14 with vigorous agitation, then passing the dispersion produced into a second reaction zone in which the reaction is completed, and recovering the resulting peroxydicarbonate in a solvent.

Such a method requires fairly complex equipment that mainly comprises two reaction vessels for forming the organic peroxydicarbonates and a container for dissolving the formed peroxydicarbonates.

It is an object of this invention to produce and to provide a method for producing organic peroxides in solution in a simple and efficient method in a continuous operation which makes use of a single reaction vessel.

These and other objects and advantages of this invention will hereinafter appear and for purposes of illustration, but not of limitation, an embodiment of the invention is shown in the accompanying drawing by way of a flow diagram.

The present invention relates to a method for the continuous preparation of organic peroxides in solution, from a peroxidic derivative of sodium, comprising sodium peroxide or sodium salts of tertio-alkyl hydroperoxides, and the acid chlorides corresponding to said organic peroxides, characterized in that a continuous displacement in a closed circuit of a liquid reaction support formed of water is generated in a reaction chamber maintained at a temperature of at least $-10°$ C., into which support there is continuously introduced sodium hydroxide, hydrogen peroxide or a tertio-alkyl hydroperoxide, said acid chloride and a solvent of said organic peroxide, at flow rates such that the pH of the support is constantly maintained at a value within the range of 3 to 10. The amount of sodium peroxide derivative formed, with an excess of from 10% to 20% of hydrogen peroxide or hydroperoxide, as in above 10% to 20% by weight with respect to the stoichiometric ratio of acid chloride/sodium peroxidic derivative, and further characterized in that resulting solution of organic peroxide is continuously separated from said support, that aqueous washing of said solution is effected, and that the washed organic peroxide solution is separated from the washing water.

In accordance with the present invention, the stoichiometric ratios of the acid chloride to the sodium peroxide, and/or the acid chloride to the sodium salt of tertio-alkyl hydroperoxides, are respectively 2/1 and 1/1.

The following are representative of the organic peroxides which can be prepared by the method of this invention: alkyl peroxydicarbonates, such as the peroxydicarbonates of methyl, ethyl, isopropyl, n-butyl, isobutyl, ethyl-hexyl; diacyl peroxides, such as the peroxides of acetyl, octanoyl, ethyl-2-hexanoyl, nonanoyl, o-methoxybenzoyl; halogenated diacyl peroxides, such as the halogenated peroxides of $\alpha,\alpha,\beta$-trichloropropionyl, $\alpha,\alpha$-dichloropropionyl, $\alpha,\alpha$-dichlorobutyroyl, $\alpha$-chlorolauroyl, $\alpha$-chlorobutyroyl, $\alpha$-chlorocaprylyl, $\alpha$-chloropropionyl, trichloroacryloyl, monochloroacetyl; and peresters, such as tertio-butyl perethoxyacetate, tertio-butyl permethoxyacetate, tertio-butyl perphenoxyacetate, tertio-butyl perpivalate.

The following are representative of the solvents which can be used: dimethyl or dibutyl phthalate, dichloroethane, and esters of fatty acids, such as alkyl adipates and sebacates.

To achieve a good performance of the method, according to the invention, the reaction chamber should be maintained at a temperature preferably within the range of $-10°$ C. to $30°$ C.

For a preferential performance of the method of the invention, the pH of the reaction support should be maintained at a value within the range of 5 to 7.

The displacement of the liquid reaction support can be produced by any mechanical means, such as a pump. It is preferable, however, to effect displacement by entrainment by means of a carrier gas, such as air or nitrogen.

A particularly advantageous embodiment of the method of the invention comprises effecting the successive steps of the method, namely, displacement of the support, introduction of the reactants, separation and washing of formed solution of organic peroxide, with a single apparatus. The accompanying drawing shows the arrangement of apparatus for the continuous preparation of solutions of organic peroxides which are heavier than water.

A vertical column A, provided with rings of the Raschig type, is provided in its lower end portion with a diffuser 1 for the introduction of a gas which causes the reaction medium to rise in the column, an introducing member 2 for introducing water, sodium hydroxide and $H_2O_2$ or tertio-alkyl hydroperoxide into an intermediate portion of the column, and an introducing member 3 for introducing acid chloride and solvent. In the upper portion, the column is provided with a double jacket B for the circulation of a coolant. The top of the column A is connected by means of a conduit C, provided with a cooling double jacket D, to the lower portion of the column A, thus providing a closed circuit through which the reaction fluid circulates. The cooled conduit C is connected in its lower portion to a decantation zone E in which the aqueous and organic layers produced are allowed to separate, and to approximately the middle portion of a washing column F. The decantation zone E is connected by means of a conduit 4 to the washing column F. The column F is provided with an agitator I having triangular blades in its lower portion while the upper portion is provided with triangular blades and discs having recesses at their periphery. The bottom portion of the column F is provided with an introducing member 5 for introducing cold water for washing the organic layer issuing from the decantation zone E by way of the conduit 4, and a pipe means 6 for discharging the solution of washed organic peroxide. The upper portion of the column F is provided with an over-flow 7 for discharging the aqueous layer and the washing water.

The apparatus can be adapted for the preparation of solutions of organic peroxides in solvents which are lighter than water, by introducing the washing water into column F at the top thereof instead of at the bottom. The organic peroxide solution is then collected at the top of the colnmn F, with the aqueous layer and the washing water going towards the bottom of the column F.

The following examples are given by way of illustration, and not by way of limitation, of the practice of this invention:

EXAMPLE 1

The preparation of a pure solution of diethyl peroxydicarbonate in dimethyl phthalate is effected, as described hereinafter, by means of the apparatus as shown in FIG. 1 and having the following features:

The reaction column used is 1200 mm. in height, 100 mm. in diameter, and has a static reaction volume of 8 liters; it is filled with Raschig rings;

With a conduit made of steel coated with powdered glass, the reaction column forms a "reaction ring" which has a total static reaction volume of 20 liters; this corresponds to a dynamic volume of 10 liters, taking into account the volume of gas introduced.

The washing column is 1500 mm. in height, 100 mm. in diameter, and is provided with discs having recesses at their peripheries, which are 90 mm. in diameter, and blades which are 80 mm. in height.

The reaction ring is filled with water, then air is introduced at a flow rate of 500 liters/hour.

There is introduced, over a period of 30 minutes, into the water passing through the column, at a temperature of 20° C., 1.5 kg. of 36° B sodium hydroxide and 0.65 kg. of 34–35% hydrogen peroxide, to form a 5% aqueous solution of sodium peroxide. 1 kg./hour of ethyl chloroformate, in a state of purity of approximately 97%, and 2 kg./hour of dimethylphthalate are then simultaneously continuously introduced; the pH of the reaction medium is 5. To maintain the sodium peroxide concentration and the pH of the medium, sodium hydroxide, water and hydrogen peroxide are simultaneously and continuously introduced throughout the operation, by means of valves controlled by a pH-meter.

After a reactants contact time of 20 minutes, the step of continuously drawing off the washed solution of ethyl peroxydicarbonate in dimethylphthalate is begun.

A pure solution of ethyl peroxydicarbonate is obtained, at an hourly flow rate corresponding to 57 g./hour of active oxygen. The operation was continued for 8 hours.

EXAMPLE 2

The operation described in Example 1 is repeated, except that the ethylchloroformate is replaced by isopropylchloroformate in a state of purity of 97%, introduced into the medium at a rate of 1 kg./hour while the pH is still maintained at 5.

A pure solution of isopropyl peroxydicarbonate in dimethylphthalate is produced, at an hourly flow rate corresponding to 51 g./hour of active oxygen. The operation lasted 8 hours.

EXAMPLE 3

The operation described in Example 1 is repeated, except that the ethylchloroformate is replaced by ethylhexylchloroformate in a state of purity of 97%, introduced at a rate of 1 kg./hour, and the dimethylphthalate is replaced by didecyl adipate, which is introduced into the reaction medium at a rate of 2 kg./hour; the pH is 5. A pure solution of ethylhexylperoxydicarbonate is obtained, in an hourly flow rate corresponding to 32 g./hour of active oxygen. The operation lasted for 8 hours.

EXAMPLE 4

The operation described in Example 1 is repeated in an apparatus of larger size:

The reaction column is 3000 mm. in height, 225 mm. in diameter and has a reaction volume of 100 liters; it is filled with Rashig rings;

With a conduit made of steel coated with powdered glass, the reaction column forms a "reaction ring" having a total reaction volume of 360 liters;

The washing column is 5 mm. in height, 150 mm. in diameter, and is provided with discs having peripheral recesses, which are 140 mm. in diameter, and blades which are 120 mm. in height.

The reaction ring is filled with water, then air is introduced at a flow rate of from 1 to 2 cubic meters per hour.

Introduced over a period of 30 minutes into the water passing through the column, at a temperature of +20° C., are 18.75 kg. of 36° B sodium hydroxide and 8.125 kg. of 34–35% hydrogen peroxide, to form an approximately 5% aqueous solution of sodium peroxide. 12.5 kg./hour of ethyl chloroformate in a state of purity of 97% and 25 kg./hour of dimethylphthalate are then continuously and simultaneously introduced; the pH of the reaction medium is 5.

To maintain the sodium peroxide concentration and the pH of the medium, water is continuously introduced throughout the operation, and also sodium hydroxide and hydrogen peroxide, such introduction being controlled by means of an electrically actuated valve controlled by an automatic pH-meter.

After a reactants contact time of 20 minutes, the operation of continuously drawing off the washed solution of ethyl peroxydicarbonate in dimethylphthalate is begun.

A pure solution of ethyl peroxydicarbonate is obtained, at an hourly flow rate of 712 g. of active oxygen. The operation lasted for 8 hours.

EXAMPLE 5

The preparation of ethyl peroxydicarbonate is carried out in the apparatus described in Example 1 and under the conditions of Example 1, from the following:

4.5 kg. of 36° B sodium hydroxide,
1.95 kg. of 34–35% hydrogen peroxide, to form a 13% aqueous solution of sodium peroxide,
3 kg./hour of ethyl chloroformate in a state of purity of 97%,
6 kg./hour of dimethylphthalate. The reaction pH is 5.

A solution of ethyl peroxydicarbonate is obtained, at an hourly flow rate of 150 g./hour of active oxygen.

EXAMPLE 6

This example relates to the preparation of trichloroacryloyl peroxide by means of the apparatus described in Example 1.

The reaction ring is filled with water, then air is introduced at a flow rate of 500 l./hour. Introduced over a period of 30 minutes into the water passing through the column, at a temperature of +20° C., are 0.750 kg. of 36° B sodium hydroxide and 0.325 kg. of 34–35% hydrogen peroxide, to form a 2% aqueous solution of sodium peroxide. The temperature of the reaction medium is then brought to 6° C. and 2.5 kg. of trichloroacryloyl chloride and 3.5 kg. of a mixture comprising 20% of dimethylphthalate and 80% of dichloroethane are continuously and simultaneously introduced; the pH of the reaction medium is 5.5. To maintain the sodium peroxide concentration and the pH of the reaction medium, sodium hydroxide and oxygenated water are simultaneously and continuously introduced throughout the operation.

After a reactants contact time of 20 minutes, the step of continuously drawing off the washed solution of trichloroacryloyl peroxide in solution in dimethylphthalate is begun. A pure solution of trichloroacryloyl peroxide is obtained, at an hourly flow rate corresponding to about 72 g. of active oxygen. The operation lasted for 5 hours.

EXAMPLE 7

This example relates to the preparation of ethyl-2-hexanoyl peroxide, by means of the apparatus described in Example 1.

The reaction ring is filled with water and then air is introduced at a flow rate of 500 l./hour.

Introduced over a period of 30 minutes into the water passing through the column, at a temperature of +20° C., are 1.5 kg. of 36° B sodium hydroxide and 0.650 kg. of 34–35% hydrogen peroxide, to form an approximately 5% aqueous solution of sodium peroxide.

After the temperature of the reaction medium has been brought to 0° C., 2 kg./hour of ethyl-2-hexanoyl chloride and 3.5 kg./hour of a mixture comprising 80% of dichloroethane and 20% of dimethylphthalate are continuously and simultaneously introduced; the pH of the reaction medium is then 7. Sodium hydroxide and hydrogen peroxide are simultaneously and continuously introduced throughout the operation, in order to maintain the sodium peroxide concentration and the pH of the reaction medium.

After a contact time of the order of 20 minutes, the step of continuously drawing off the washed solution of ethyl-2-hexanoyl peroxide in the dichloroethane/dimethylphthalate mixture is begun.

A pure solution of ethyl-2-hexanoyl peroxide is obtained, at an hourly flow rate of about 68 g. of active oxygen.

EXAMPLE 8

This example relates to the preparation of α-chloropropionyl peroxide, by means of the apparatus described in Example 1.

The reaction ring is filled with water, then air is introduced at a flow rate of 500 l./hour.

Introduced over a period of 30 minutes into the water passing through the column and containing approximately 10% of sodium chloride, at a temperature of 20° C., are 1.5 kg. of 36° B sodium hydroxide and 0.650 kg. of 34–35% hydrogen peroxide, to form a 5% aqueous solution of sodium peroxide.

After the temperature of the reaction medium has been brought to −5° C., 1.5 kg./hour of α-chloropropionyl chloride and 2.5 kg./hour of a mixture comprising 80% of dichloroethane and 20% of dimethylphthalate are then introduced continuously and simultaneously; the pH of the reaction medium is then 6.

In order to maintain the sodium peroxide concentration and the sodium chloride concentration, and also the pH of the reaction medium, 36° B sodium hydroxide and hydrogen peroxide, and also an aqueous solution of sodium chloride, are introduced simultaneously and continuously throughout the operation.

After a reactants contact time of 20 minutes, the step of continuously drawing off the washed solution of α-chloropropionyl peroxide in the dichloroethane/dimethylphthalate mixture is begun. A pure solution of α-chloropropionyl peroxide is obtained, at an hourly flow rate corresponding to 75 g. of active oxygen.

EXAMPLE 9

This example relates to the operation, in the apparatus described in Example 1, of tertio-butyl perethoxyacetate.

The reaction ring is filled with water, then air is introduced at a flow rate of 500 l./hour.

Introduced over a period of 30 minutes into the water passing through the column and containing 20% of sodium chloride, at a temperature of +10° C., are 1.5 kg. of 36° B sodium hydroxide and 1.3 kg. of tertio-butyl hydroperoxide. After the temperature of the reaction medium has been brought to −10° C., 1.1 kg./hour of ethoxyacetylchloride and 4.5 kg./hour of a mixture comprising 80% of dichloroethane and 20% of dimethylphthalate are then introduced continuously and simultaneously; the pH of the reaction medium is then 6.

In order to maintain the tertio-butyl hydroperoxide and sodium chloride concentration, and also the pH of the reaction medium, 36° B sodium hydroxide, tertio-butyl hydroperoxide, and an aqueous solution of sodium chloride, are introduced simultaneously and continuously throughout the operation.

After a reactants contact time of 20 minutes, the step of drawing off the washed solution of tertio-butyl perethoxyacetate in the dichloroethane/dimethylphthalate mixture is begun. A pure solution of tertio-butyl perethoxyacetate is obtained, at an hourly flow rate corresponding to 102 g. of active oxygen.

As used herein, the letter "B" stands for "Baume."

It will be understood that changes may be made in the details of formulation and operation without departing from the spirit of the invention, especially as defined in the following claims.

I claim:

1. A process for the continuous preparation of alkylperoxydicarbonates in solution from sodium peroxide and alkylchloroformates comprising continuously circulating in a reaction chamber an aqueous liquid maintained at a temperature of at least −10° C., continuously introducing into said aqueous liquid sodium hydroxide, hydrogen peroxide in a stoichiometric excess of 10–20%, alkylchloroformate and a solvent for said alkylperoxydicarbonate, at flow rates such that the pH of the aqueous liquid is constantly maintained at a value within the range of 3 to 10, whereby the amount of sodium hydroxide formed is in excess of 10–20% by weight with respect to the stoichiometric ratio of the alkylformate/sodium peroxide, continuously separating the obtained solution of alkylperoxydicarbonate from the aqueous liquid, washing said solution with water, and separating the washed solution of alkylperoxydicarbonate from the wash water.

2. A method as claimed in Claim 1 in which the reaction chamber is maintained at a temperature within the range of −10° C. to +30° C.

3. A method as claimed in Claim 1 in which the pH of the aqueous liquid is constantly maintained at a value within the range of 5 to 7.

4. The process as claimed in Claim 3 in which the pH is 5.

5. A method as claimed in Claim 1 in which the circulation of the aqueous liquid in the reaction chamber is achieved by entrainment by means of a carrier gas.

6. A method as claimed in Claim 5 in which the carrier gas is air or nitrogen.

7. The process as claimed in Claim 1 in which the solvent is selected from the group consisting of dimethyl and dibutyl phthalate, dichloroethane, and esters of aliphatic dicarboxylic acids.

8. The process as claimed in Claim 7 in which the esters of aliphatic dicarboxylic acids are selected from the group consisting of alkyladipates and alkylsebacates.

9. A method as claimed in Claim 1 in which the reaction chamber comprises a vertical column having at its upper end portion a cooling jacket, the upper portion of the column being connected to the lower portion of the column by a conduit having a cooling jacket.

References Cited

UNITED STATES PATENTS

| | | | |
|---|---|---|---|
| 2,816,147 | 12/1957 | Weber et al. | 260—610 |
| 3,377,373 | 4/1968 | Lederer et al. | 260—463 |

FOREIGN PATENTS

| | | |
|---|---|---|
| 667,317 | 7/1963 | Canada. |
| 950,978 | 3/1964 | Great Britain. |

LEWIS GOTTS, Primary Examiner

D. G. RIVERS, Assistant Examiner

U.S. Cl. X.R.

260—453 R, 610 D

UNITED STATES PATENT OFFICE
CERTIFICATE OF CORRECTION

Patent No. 3,849,468　　　　　　　　Dated　November 19, 1974

Inventor(s) Robert Busseret

It is certified that error appears in the above-identified patent and that said Letters Patent are hereby corrected as shown below:

column 6, lines 36 and 37, change "reaction chamber"
        to --- aqueous liquid ---

Signed and sealed this 13th day of May 1975.

(SEAL)
Attest:

RUTH C. MASON
Attesting Officer

C. MARSHALL DANN
Commissioner of Patents
and Trademarks